Patented Apr. 23, 1929.

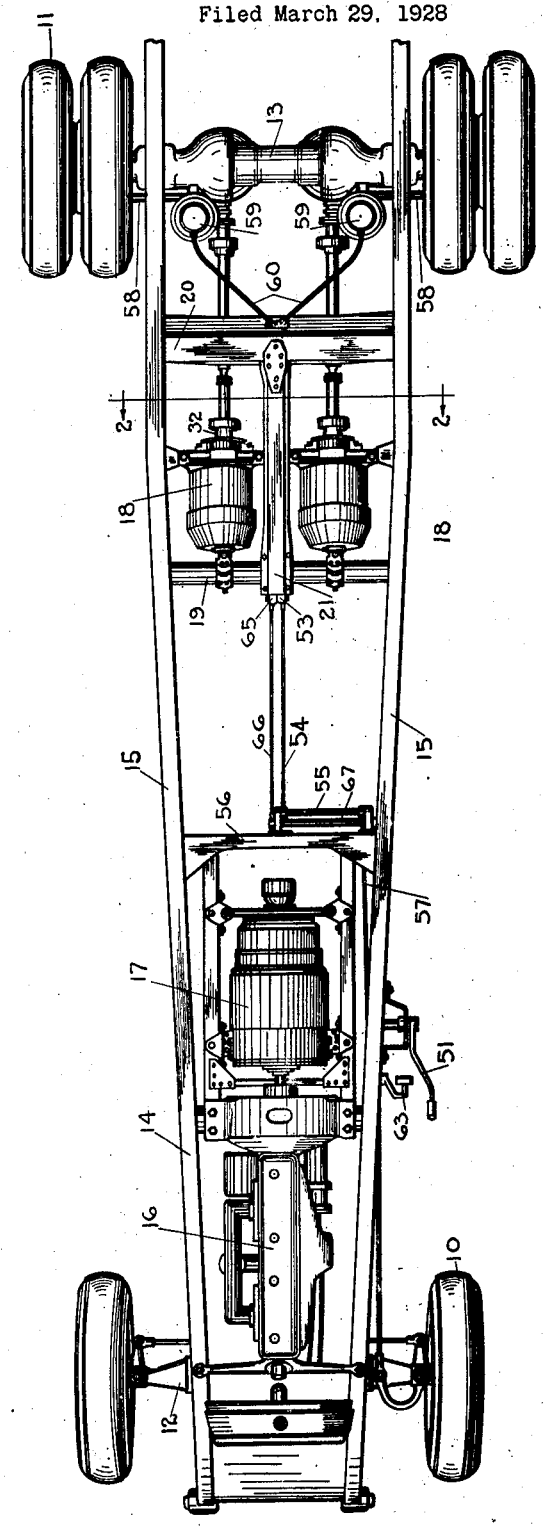

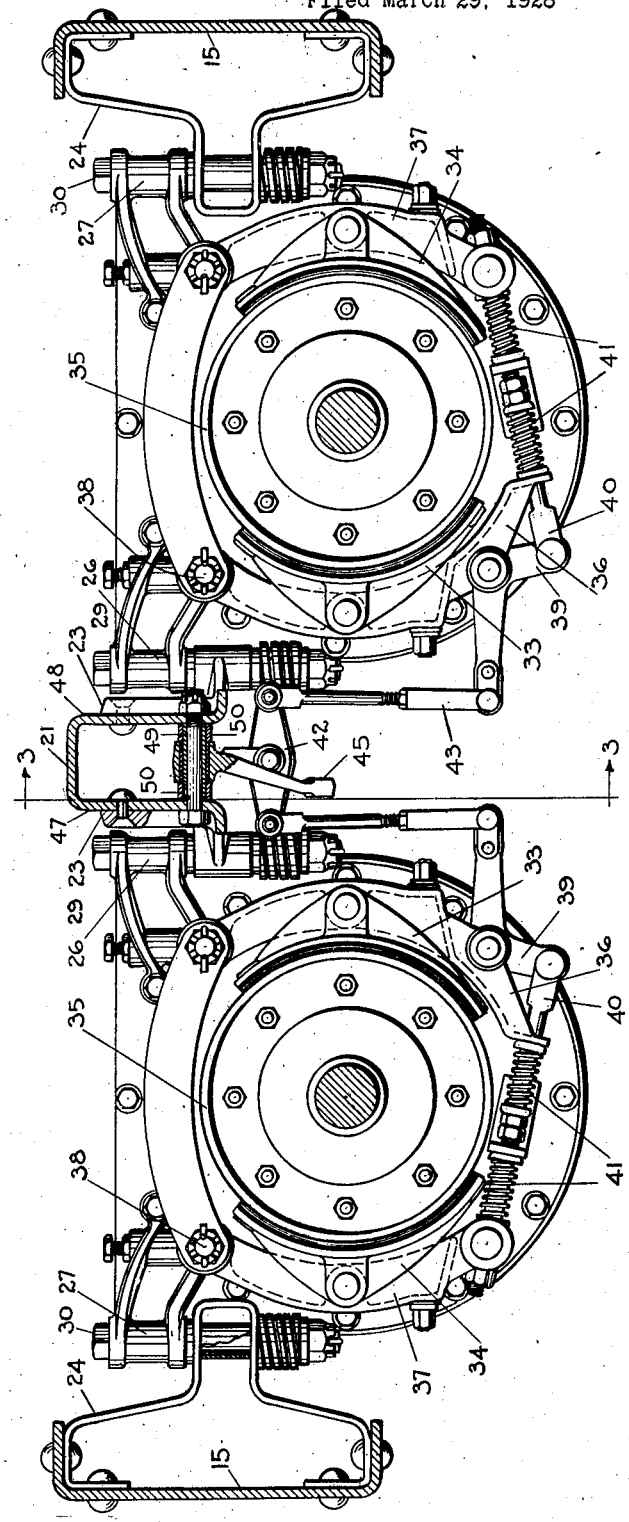

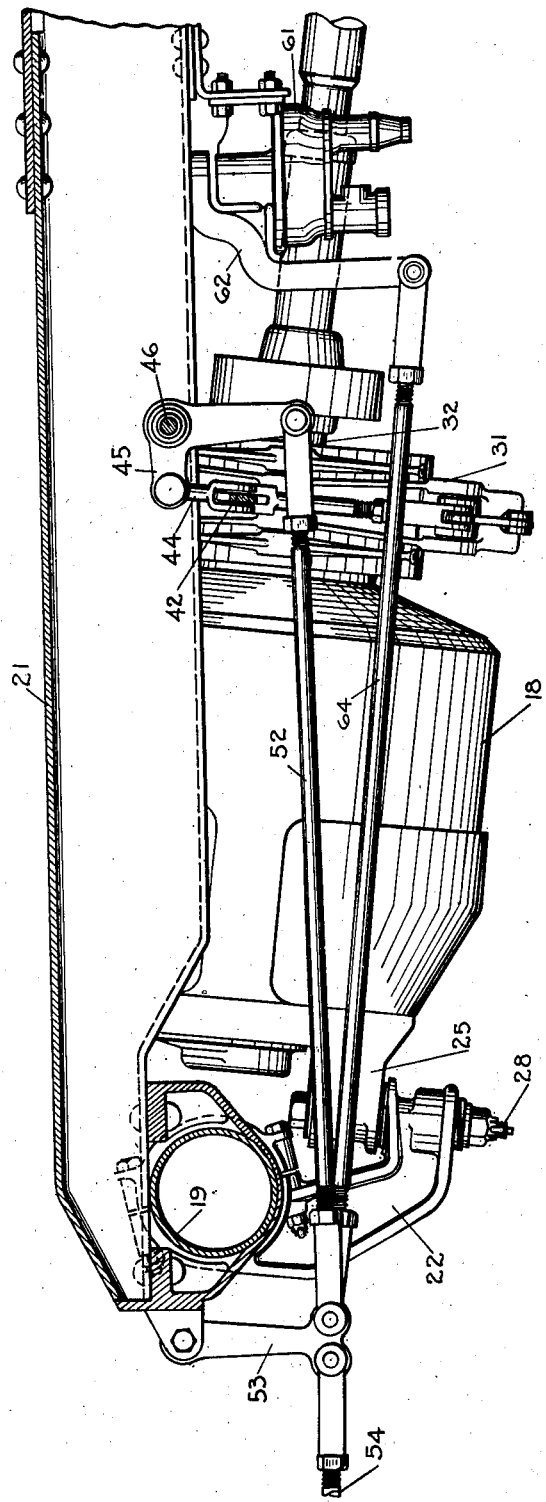

1,710,345

UNITED STATES PATENT OFFICE.

HAROLD D. CHURCH, OF CLEVELAND, OHIO, ASSIGNOR TO THE WHITE MOTOR COMPANY, OF CLEVELAND, OHIO, A CORPORATION OF OHIO.

MOTOR VEHICLE.

Application filed March 29, 1928. Serial No. 265,744.

This invention relates broadly to motor vehicles and more specifically to an improved organization of frame members for supporting the propulsion elements thereof.

An object of this invention is to construct a vehicle chassis frame having a supplemental reinforcing structure which is capable of neutralizing the road shocks imposed upon the frame side members and which, in addition, is subservient to the support of certain driving and braking adjuncts.

Another object of this invention is to provide a frame member which is so disposed in relation to the driving elements of the vehicle as to accommodate the support thereof, and to afford a functional utility with certain of the vehicular braking elements.

Another object of this invention is to provide a frame structure, the configuration of certain members of which are congruous with the appurtenances supported thereby.

Another object of this invention is to provide a frame structure which is of durable construction, economic design, and which is capable of being erected in bench subassembly.

Other objects and important features of this invention will appear from the following description and claims when considered in connection with the accompanying drawings in which—

Figure 1 is a plan view of a vehicle chassis constructed in accordance with this invention, Figure 2 is a transverse section taken on line 2—2 of Figure 1, and Figure 3 is a longitudinal section taken on line 3—3 of Figure 2.

Referring to the drawings, the chassis illustrated comprises the usual front steering wheels 10, rear or driving wheels 11, and front and rear axles 12 and 13 respectively. The axles support the chassis frame 14 comprising a pair of side rails 15 connected by a plurality of cross members, two of which will be presently described. Mounted on the forward portion of the frame 14 is an internal combustion engine 16 and an operatively associated dynamo 17, and between certain frame members near the rear of the chassis is suspended a pair of electric motors 18 adapted to receive current from the dynamo 17, and operatively connected to the driving wheels 11.

The section of the frame that supports the motors 18 comprises, in addition to the side rails 15, a forwardly disposed transverse rod 19, a rearwardly disposed transverse channel member 20, and a longitudinally extending channel member 21 connecting the midpoints of said transverse members. The motors 18 are supported at their forward ends by depending arms 22 clamped to rod 19, and at their rear ends by hanger arms 23 and 24 secured, respectively, to channel member 21 and side rails 15. As clearly shown in Figures 1 and 2 of the drawing, the casings of the motors are provided with forwardly extending lugs 25 and transversely extending arms 26 and 27, which rest respectively upon supporting elements 22, 23 and 24, above described, and are attached thereto by bolts 28, 29 and 30.

The chassis comprises manually operated brakes 31 cooperatively associated with armature shafts 32 of motors 18, and fluid operated brakes, not shown, associated with the driving or traction wheels 11. The brakes 31 are mounted on the rear ends of the motors 18, and comprise brake shoes 33 and 34 engageable with brake drums 35 carried on armature shafts 32. The shoes 33 and 34 are respectively attached by means of suitable pivotal connections to levers 36 and 37, which levers are fulcrumed on studs 38, screw threaded into the casings of the motors 18. The levers 36 and 37 of each brake are connected at their free ends by an actuating mechanism which comprises a bell crank 39 fulcrumed on lever 36, a rod 40 connecting the shorter arm of the bell crank with the free end of the lever 37, and a pair of compression springs 41 encircling the rod 40 and urging the levers 36 and 37 apart. Inasmuch as this mechanism forms no part of the present invention and is of conventional construction, further description is deemed unnecessary. The longer arms of the bell cranks 39 are respectively connected to the opposite ends of an equalizing bar 42 by means of pull rods 43 pivotally attached to both members. The bar 42, as clearly shown in Figures 2 and 3, is fulcrumed, intermediate its ends, in a shackle arm 44 articulated to the upper arm of a bell crank 45, which crank is pivotally carried by a bolt 46 extending between and through the side walls 47 and 48 of the channel member 21. The mounting for the bell crank 45, in addition to the bolt 46, comprises a sleeve 49 surrounding the intermediate portion of the bolt, and a pair of sleeves 50 mounted upon the first named sleeve on opposite sides of the crank 45, securing the same against transverse movement. The lower depending arm of the bell crank 45, as illustrated in Figures 1 and 3, is connected to a hand operated lever 51 by means of a pull rod linkage comprising a pull rod 52, a relay arm 53 mounted at the forward end of channel member 21, a second pull rod 54, a rocker arm assembly 55, mounted on a cross member 56, and a third pull rod 57.

The brakes associated with the wheels are controlled by cams, not shown, mounted on the outer ends of shafts 58. These shafts are operatively connected by suitable linkages to diaphragms within the pressure chambers 59 which communicate through conduits 60 and control valve 61 with a pressure tank, not shown. The control valve 61, as illustrated in Figure 3, is mounted on the channel member 21 slightly to the rear of the bell crank 45, and is provided with an operating lever 62 operatively connected to a foot pedal 63 by means of a pull linkage. This linkage, as will be readily discerned from the drawings, is similar in arrangement and construction to the linkage which connects the lower arm of the bell crank 45 to the hand lever 51. It comprises a pull rod 64, a relay arm 65, a second pull rod 66, a rocker arm assembly 67, and third pull rod hidden within the frame member 15.

Although the foregoing description is necessarily of a detailed character, in order that the invention may be completely set forth, it is to be understood that the specific terminology is not intended to be restrictive or confining, and that various rearrangements of parts and modifications in structural details may be resorted to without departing from the scope or spirit of the invention as claimed.

What I claim is:

1. In a motor vehicle chassis, a plurality of propeller drive shafts, brakes cooperatively associated with said shafts, common actuating mechanism for said brakes, and a longitudinal frame member disposed intermediate said propeller shafts and supporting elements of said actuating mechanism.

2. In a motor vehicle chassis, a plurality of propeller drive shafts, brakes cooperatively associated with said shafts, actuating mechanism for said brakes, and an interior longitudinal frame member supporting elements of said actuating mechanism.

3. In a motor vehicle chassis, a plurality of propeller drive shafts, an interior longitudinal frame member affording support for said shafts, brakes cooperatively associated with said shafts, and mechanism for actuating said brakes comprising elements supported by said frame member.

4. In a motor vehicle chassis, a propeller drive shaft, a brake cooperatively associated with said shaft, a U-shaped frame member, and mechanism for actuating the brake comprising an element pivoted within said member.

5. In a motor vehicle chassis, a plurality of propeller drive shafts, a brake cooperatively associated with each of said shafts, a U-shaped frame member, and mechanism for actuating said brakes comprising an element pivoted within said member operatively connected to each of said brakes.

6. In a motor vehicle, a frame comprising side rails and a longitudinal member supported between said rails, driving units mounted on said rails and said longitudinal member, propeller driving shafts connecting said units to driving wheels of the vehicle, brakes cooperatively associated with said propeller shafts, and mechanism for actuating said brakes comprising elements supported by said longitudinal member.

7. In a motor vehicle, a frame comprising side rails and an intermediate member, driving units mounted on said rails and said intermediate member, propeller driving shafts connecting said units to driving wheels of the vehicle, brakes cooperatively associated with said propeller shafts, and mechanism for actuating said brakes comprising elements supported by said intermediate member.

8. In a motor vehicle, a frame comprising side rails and a U-shaped member supported between said rails, driving units mounted on said rails and said U-shaped member, propeller drive shafts connecting said units to driving wheels of vehicle, brakes cooperatively associated with said propeller shafts, and mechanism for actuating said brakes comprising an element pivoted within said U-shaped member.

9. In a motor vehicle, a frame comprising side rails and a longitudinal U-shaped member supported between said rails, driving units mounted on said rails and said longitudinal U-shaped member, propeller drive shafts connecting said units to driving wheels of vehicle, brakes cooperatively associated with said propeller shafts, and mechanism for actuating said brakes comprising an element pivoted within said U-shaped member.

In testimony whereof I hereunto affix my signature this 26th day of March, 1928.

HAROLD D. CHURCH.